| United States Patent [19] | [11] Patent Number: 4,707,344 |
|---|---|
| Thomas | [45] Date of Patent: Nov. 17, 1987 |

[54] PRODUCTION OF INGREDIENTS FOR DETERGENTS AND SOAP POWDERS FROM ALKALI PHOSPHATES

[76] Inventor: Griffith Thomas, 81 Lynbara Avenue, St. Ives, New South Wales, 2075, Australia

[21] Appl. No.: 690,616

[22] Filed: Jan. 11, 1985

[30] Foreign Application Priority Data

Jan. 25, 1984 [AU] Australia .............................. PG3344

[51] Int. Cl.$^4$ .............................................. C01B 15/16
[52] U.S. Cl. .................................... 423/312; 423/305; 423/315
[58] Field of Search ......................... 423/312, 305, 315

[56] References Cited

U.S. PATENT DOCUMENTS

| 1,105,304 | 7/1914 | Reed | 423/167 |
|---|---|---|---|
| 2,182,357 | 12/1939 | Schwartz | 423/312 X |
| 2,396,918 | 3/1946 | Hufford et al. | 423/315 |
| 3,600,152 | 8/1971 | Drechsel et al. | 423/308 X |
| 3,777,008 | 12/1973 | McIver | 423/316 |
| 3,993,734 | 11/1976 | Verdier et al. | 423/305 X |
| 4,534,946 | 8/1985 | Damman et al. | 423/305 X |

FOREIGN PATENT DOCUMENTS

| 1196167 | 7/1965 | Fed. Rep. of Germany | 423/312 |
|---|---|---|---|
| 0436335 | 10/1935 | United Kingdom | 423/312 |
| 1145903 | 4/1965 | United Kingdom . | |
| 990172 | 4/1965 | United Kingdom . | |

*Primary Examiner*—Andrew Metz
*Assistant Examiner*—William G. Wright
*Attorney, Agent, or Firm*—Cushman, Darby & Cushman

[57] ABSTRACT

A process for production of alkali metal polyphosphates and/or pyriphosphates from an alkali metal orthophosphate comprises acidifying said orthophosphate with sulphuric acid, and then either (a) heating the reaction mixture to produce the desired products, and recovering said products from the reaction mixture, or (b) separating an intermediate from the reaction mixture, and heating the intermediate to form a desired product.

The products are suitable for incorporation into detergents and soap powders.

19 Claims, No Drawings

PRODUCTION OF INGREDIENTS FOR DETERGENTS AND SOAP POWDERS FROM ALKALI PHOSPHATES

This invention relates to the production of soap powder and detergent ingredients from alkali metal phosphates.

In a principal aspect of the invention provides a process for production of alkali metal poly and/or pyrophosphates involving reaction of an orthophosphate with sulphuric acid.

In one form of the invention, trisodium orthophosphate is acidified with sulphuric acid and then heat-treated to yield a mixture of pentasodium tripolyphosphate and sodium sulphate. In a second form of the invention, disodium orthophosphate, produced from trisodium orthophosphate by methods outlined in my Australian patent application No. 31620/84, is acidified with sulphuric acid. The mixture was then heat-treated to give a mixture of pentasodium tripolyphosphate and sodium sulphate.

In a third form of the invention trisodium orthophosphate is acidified with sufficient sulphuric acid in solution to form disodium orthophosphate and sodium sulphate. The two compounds were separated by crystallization and the disodium orthophosphate heat treated to give tetrasodium pyrophosphate.

The above-mentioned processes may be represented by the following simplified typical reactions:

$$3Na_3PO_4 + 2H_2SO_4 \rightarrow 2Na_2SO_4 + Na_5P_3O_{10} + 2H_2O \quad (1)$$

$$6Na_2HPO_4 + H_2SO_4 \rightarrow 2Na_5P_3O_{10} + Na_2SO_4 + 4H_2O \quad (2)$$

$$2Na_3PO_4 + H_2SO_4 \rightarrow 2Na_2HPO_4 + Na_2SO_4 \quad (3)$$

$$2Na_2HPO_4 \rightarrow Na_4P_2O_7 + H_2O \quad (4)$$

While the above reactions refer to sodium phosphates, it should be clearly understood that potassium compounds may be used instead of the corresponding sodium compounds.

Advantages

Modern detergents and "soap powders" are usually a mixture of ingredients to give desirable washing properties at minimal cost. A typical mixture might be:
 1 part sodium carbonate
 2 parts pentasodium tripolyphosphate
 4 parts sodium sulphate plus lesser amounts of sulphonated petroleum fractions, perfume and colouring The pentasodium tripolyphosphate is currently made by reacting highly purified wet process or furnace grade phosphoric acid with sodium carbonate and heat treating the products. This is an expensive process.

Trisodium orthophosphate of high purity can readily be made by caustic soda extraction or sodium carbonate fusion of naturally occurring phosphate rocks (Rothbaum N. Z. Journal of Science, Vol. II No. 4, 4th December, 1968; G. Thomas Provisional Specification PG 0279, 14th July, 1983).

High purity disodium phosphate can in turn be made by carbonating the trisodium phosphate by methods outlined in my Australian patent application No. 31620/84:

$$2Na_3PO_4 + CO_2 + H_2O \rightarrow 2Na_2HPO_4 + Na_2CO_3$$

By reacting trisodium phosphate or disodium phosphate with sulphuric acid we obtain precursors of poly or pyrophosphates together with the corresponding sulphate. The mixture can be separated after reaction, and before heat treatment, or it can be left as is for incorporation after heat treatment into the basic detergent soap powder mixture.

Sulphuric acid is readily available as a by-product of various operations, one of which is the sulphonation of petroleum fractions to form an ingredient for detergents and soap powders. Carbon dioxide is a by-product of heat-treating operations.

In recent times caustic soda and sodium carbonate have become very cheap on the world market, and my process allows them to be used along with low grade phosphate rocks and by-product sulphuric acid to produce valuable detergent and soap powder ingredients much more cheaply than by conventional processes.

EXAMPLE 1

100 gm of hydrated trisodium orthophosphate crystals $Na_3PO_4.12H_2O$ produced by the caustic extraction of Christmas Island C grade rock were mixed with 17.2 gm of 80% sulphuric acid (measured as 100% $H_2SO_4$). The sulphuric acid was a by-product of sulphonating dodecyl benzene to form a soap powder ingredient.

Reaction between trisodium orthophosphate and sulphuric acid evolved a great deal of heat, driving off some of the water of crystallization and reaction. The reactants were further heated to between 300° and 500° C., and then cooled to give the desired phase ratio of tripolyphosphate. The resulting product was suitable for incorporation in mixtures for spray dried soap powders.

EXAMPLE 2

100 gm of hydrated disodium orthophosphate made by carbonating trisodium phosphate and separating the resulting sodium crabonate was reacted with 4.6 gm of 80% sulphuric acid (measured as 100% $H_2SO_4$).

The reaction between disodium phosphate and sulpuric acid evolved heat, driving off some of the water of crystallization and reaction. The reactants were further heated to a temperature of 300°-500° C., and then cooled to give the desired phase ratio of tripolyphosphate forms. The resulting product was suitable for incorporation into mixtures for spray-dried soap powders.

EXAMPLE 3

100 gm of hydrated trisodium orthophosphate crystals was dissolved in water and then mixed with 13 gm (measured as $H_2SO_4$) of dilute sulphuric acid.

The resulting solution was cooled to 20° C., when crystals of disodium phosphate formed. These were filtered off, dried and heated to 400°-600° C. to form tetrasodium pyrophosphate.

The filtrate after removing disodium phosphate crystals was evaporated to crystallize out sodium sulphate and the mother liquor recycled to the next batch.

It will be clearly understood that the invention in its general aspects is not limited to the specific details referred to hereinabove.

I claim:
 1. A process for the production of alkali metal polyphosphates and/or pyrophosphates, comprising the steps of producing an alkali metal orthophosphate by alkaline treatment of phosphate rock, acidifying said orthophosphate by alkaline treatment of phosphate rock, acidifying said orthophosphate with sulphuric acid, heating the reaction mixture at to a temperature of from 300° to 600° C. to produce alkali metal polyphosphates and/or pyrophosphates, and recovering said alkali metal polyphosphates and/or pyrophosphates from the reaction mixture.

2. A process for the production of alkali metal polyphosphates and/or pyrophosphates comprising the steps of:

producing an alkali metal orthophosphate by alkaline treatment of phosphate rock, acidifying said orthophosphate with sulphuric acid, separating an intermediate from the reaction mixture, and heating the intermediate to a temperature of from 300° to 600° C. to form said alkali metal polyphosphates and/or pyrophosphates.

3. A process according to claim 1 in which the alkalimetal orthophosphate is trisodium orthophosphate.

4. A process according to claim 1 in which the alkali metal orthophosphate is tripotassium orthophosphate.

5. A process according to claim 1 in which the heat treatment is carried out at 300°–500° C.

6. A process according to claim 1 in which the weight ratio of sulphuric acid to alkali-metal orthophosphate is 3–14 gm sulphuric acid per 100 gm alkali metal orthophosphate.

7. A process according to claim 1 in which the alkali metal othophosphate is disodium orthophosphate.

8. A process according to claim 1 in which the alkali metal orthophosphate is tripotassium orthophosphate.

9. Process as claimed in claim 3 for the production of tripolyphosphate wherein trisodium orthophosphate is acidified with sulphuric acid, the reaction is mixture heated to between 300° C. and 500° C. to form tripolyphosphate, and tripolyphosphate is recovered from the reaction mixture.

10. A process according to claim 2 in which the alkali metal orthophosphate is disodium orthophosphate.

11. A process according to claim 2 in which the alkali metal orthophosphate is tripotassium orthophosphate.

12. A process according to claim 2 in which the heat treatment is carried out at 400°–600° C.

13. A process according to claim 2 in which the alkali-metal othophosphate is trisodium orthophosphate.

14. A process according to claim 2 in which the alkali-metal orthophosphate is tripotassium orthophosphate.

15. A process according to claim 2 in which the treatment is carried out at 300°–500° C.

16. A process according to claim 2 in which the weight ratio of sulphuric acid to alkali-metal orthophosphate is 3–14 gm sulphuric acid per 100 gm alkali metal orthophosphate.

17. Process as claimed in claim 13 for the production of tetrasodium pryophosphate, wherein trisodium orthophosphate is acidified with sulfuric acid, disodium orthophosphate is separated from the reaction mixture and the disodium orthophosphate so separated is heated to btween 400° C. and 600° C. to form tetrasodium pyrophosphate.

18. A process for production of alkali metal polyphosphate and/or pyrophosphates from an alkali metal orthophosphate, said alkali metal orthophosphate being selected from the group consisting of trisodium orthophosphate, disodium orthophosphate, tripotassium orthophosphate and dipotassium orthophosphate, said process comprising:

acidifying said orthophosphate with sulphuric acid;

heating the reaction mixture to a temperature of from 300° to 600° C. to produce said alkali metal polyphosphates and/or pyrophosphates; and recovering said alkali metal polyphosphates and/or pyrophosphates from the reaction mixture.

19. A process for production of alkali metal orthophosphate and/or pyrophosphates from an alkali metal orthophosphate, said alkali metal orthophosphate being selected from the group consisting of trisodium orthophosphate, disodium orthophosphate, tripotassium orthophosphate and dipotassium orthophosphate, said process comprising:

acidifying said orthophosphate with sulphuric acid;

separating an intermediate from the reaction mixture; and heating the intermediate to a temperature of from 300° to 600° C. to form said alkali metal polyphosphate and/or pyrophosphate.

* * * * *